United States Patent [19]

Kotaki et al.

[11] Patent Number: 5,313,349
[45] Date of Patent: May 17, 1994

[54] CARTRIDGE AUTOLOADING APPARATUS HAVING TWO SAFETY LOCK MECHANISMS

[75] Inventors: Yoshio Kotaki; Hiroyuki Sugihara; Tetsuo Nagahori, all of Kawasaki, Japan

[73] Assignee: Fujitsu Limited, Japan

[21] Appl. No.: 853,472

[22] Filed: Mar. 18, 1992

[30] Foreign Application Priority Data

Mar. 18, 1991 [JP] Japan .................................. 3-052812
Apr. 18, 1991 [JP] Japan .................................. 3-086814

[51] Int. Cl.⁵ .......................................... G11B 15/68
[52] U.S. Cl. ................................................... 360/92
[58] Field of Search .................... 360/71, 92; 414/273, 414/932

[56] References Cited

U.S. PATENT DOCUMENTS 5,182,687 1/1993 Campbell et al. ................. 360/71

Primary Examiner—Edward K. Look
Assistant Examiner—Christopher Verdier
Attorney, Agent, or Firm—Greer, Burns & Crain, Ltd.

[57] ABSTRACT

A cartridge autoloading apparatus attached to a cartridge recording and retrieval apparatus includes two safety lock mechanisms for stopping abnormal ascending and descending operations of a magazine which accommodates therein a plurality of cartridges. Due to the two safety lock mechanisms, the cartridge autoloading mechanism is safer than a conventional one.

7 Claims, 20 Drawing Sheets

CARTRIDGE AUTOLOADING APPARATUS HAVING TWO SAFETY LOCK MECHANISMS

BACKGROUND OF THE INVENTION

The present invention relates generally to cartridge autoloading apparatuses, and more particularly to a cartridge autoloading apparatus, attached to a cartridge recording and retrieval apparatus, which includes a pillar-shaped magazine accommodating a plurality of cartridges therein, and automatically loads one of the cartridges into the cartridge recording and retrieval apparatus.

As the performance ability of computers has recently been improved, a large storage capacity is now required. A magnetic tape cartridge recording and retrieval apparatus and a magnetic autoloading apparatus are used, as backup apparatuses, for a main storage of a computer, such as a hard disk storage, the autoloading apparatus sequentially loading a magnetic tape cartridge into the magnetic tape cartridge recording and retrieval apparatus.

A brief description will now be given, with reference to FIG. 1, of a conventional magnetic tape cartridge autoloading apparatus.

A magnetic tape cartridge autoloading apparatus 10 is attached to a front side of a magnetic tape cartridge recording/reproducing apparatus 11. As shown in FIG. 1, the magnetic tape cartridge recording and retrieval apparatus 11 is inserted into a rack 12, and the magnetic tape cartridge autoloading apparatus 10 projects from a front panel 13 of the rack 12. The apparatus 10 has a perforation opening 14 perforated in a vertical direction. The pillar-shaped magazine 15 is inserted into the perforation opening 14. The magazine 15 has a plurality of shelves 16 in the vertical direction thereof, each of which accommodates therein a magnetic tape cartridge 17. The apparatus 10 further includes a magazine ascending and descending mechanism 18 and a magnetic tape cartridge loading mechanism 19.

When the magazine ascending and descending mechanism 18 is driven through a predetermined command, the magazine 15 ascends in a direction $Z_1$, or descends in a direction $Z_2$, via the perforation opening 14, and stops at a predetermined position. Subsequently, the cartridge loading mechanism 19 is driven, and a magnetic tape cartridge 17 is moved in a direction $X_1$, so as to be extracted from the magazine 15 and loaded into the recording and retrieval apparatus 11. After the recording and retrieval operations for the loaded magnetic tape cartridge 17 are completed, the cartridge loading mechanism 19 is driven in a reverse direction to return the magnetic tape cartridge 17 to the shelf in the magazine 15. Next, the magazine 15 is made to ascend or descend so as to be returned to the initial position.

The apparatus 10 has a safety lock mechanism 20 only at a crown plate 21 thereon. The mechanism 20 is actuated when the magnetic tape cartridge 17 is inserted with an incorrect orientation into the magazine 15 or when an operator accidentally holds his/her finger between the shelves 16 and the crown plate 21; a motor of the magazine ascending and descending mechanism 18 is immediately stopped, as a result.

However, the conventional cartridge autoloading apparatus has disadvantages. That is, if a lower magnetic tape cartridge 17-1 projects in the direction $X_1$, as shown by the two-dotted lines in FIG. 1, due to a damaged lock tab (not shown) in the magazine 15, or if an operator accidentally puts his/her finger between the bottom plate 22 and a shelve 16, the safety lock mechanism will not work and the magazine ascending and descending mechanism 18 will continue to operate. As a result, the magnetic tape cartridge 17-1 and the magazine 15 get damaged, and an operator sometimes gets injured.

SUMMARY OF THE INVENTION

Accordingly, it is a general object of the present invention to provide a novel and useful cartridge autoloading apparatus in which the above disadvantages are eliminated.

Another more specific object of the present invention is to provide a cartridge autoloading apparatus having two safety lock mechanisms at a crown plate side and a bottom plate side.

According to the present invention, since a motor of a magazine ascending and descending mechanism is stopped when the magazine is detected to abnormally ascend or descend, the cartridge autoloading mechanism is safer than the conventional one.

Still another object of the present invention is to provide a cartridge autoloading apparatus in which a safety lock mechanism located at a crown plate and one located at a bottom plate use a common switch.

According to the present invention, the controller of the above cartridge autoloading apparatus can be made simpler than that of a cartridge autoloading apparatus in which each safety lock mechanism has a separate switch.

Other objects and further features of the present invention will become apparent from the following detailed description when read in conjunction with the accompanying drawings.

DETAILED DESCRIPTION OF THE PREFERRED EMBODIMENTS

Figure 1:
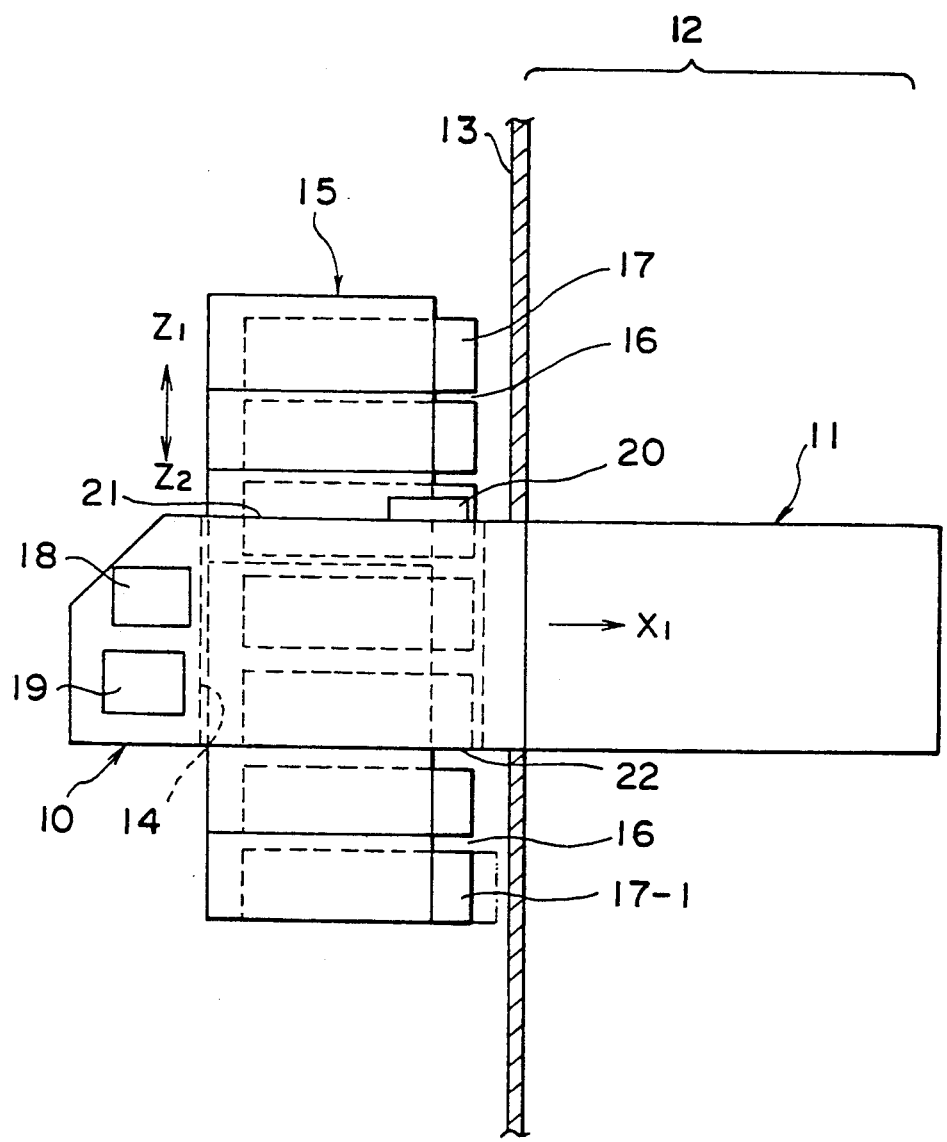
FIG. 1 shows a schematic view of a conventional magnetic tape cartridge autoloading apparatus.
Figure 2:
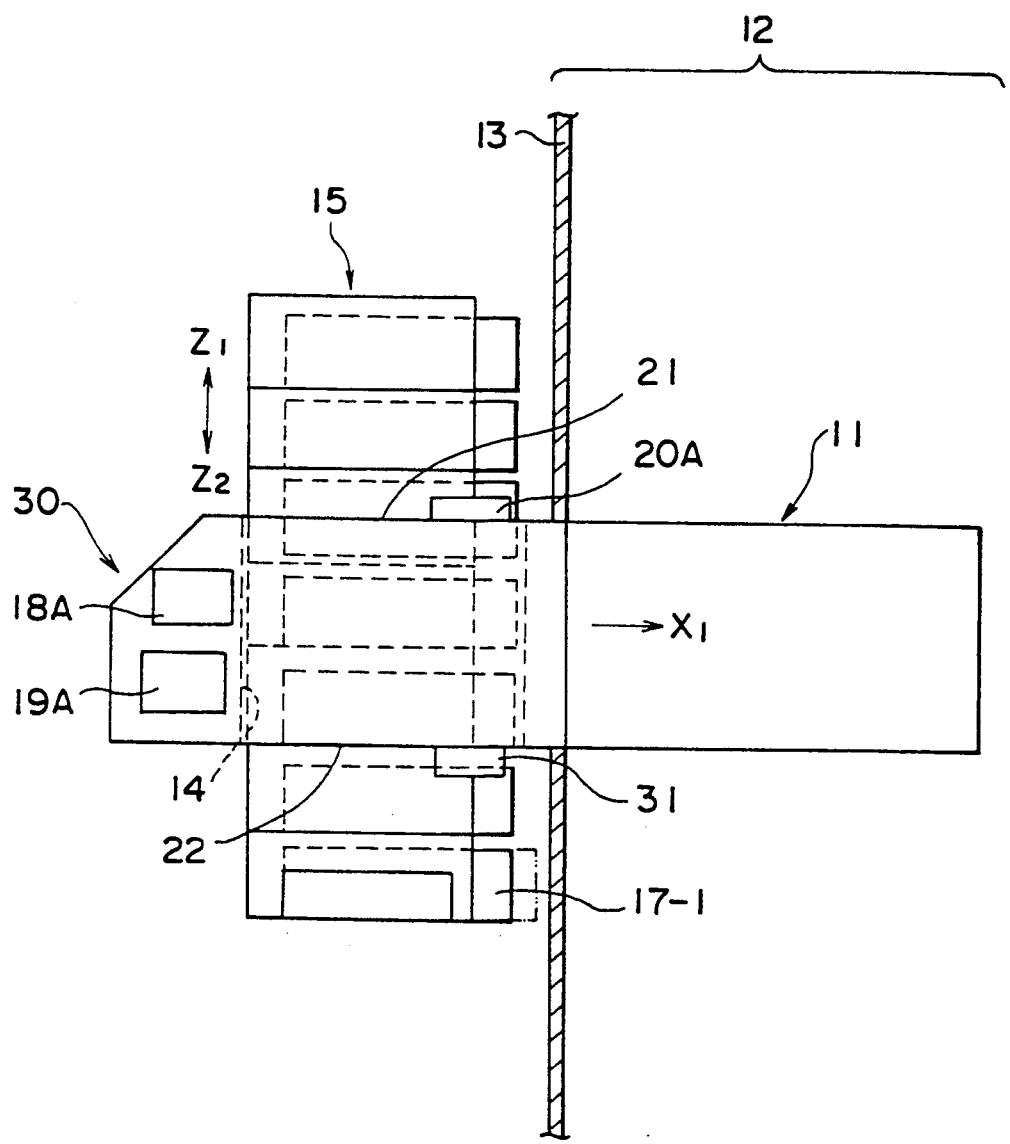
FIG. 2 shows a view for explaining a basic idea of a cartridge autoloading apparatus according to the present invention.

FIG. 2 shows a principle view of a cartridge autoloading apparatus 30. Those elements in FIG. 2 which are the same as corresponding elements in FIG. 1 are designated by the same reference numerals, and a description thereof will be omitted. Numeral 31 denotes a safety lock mechanism located at a bottom plate 22. The cartridge autoloading apparatus 30 includes, a safety lock mechanism 20A at a crown plate 21 and the safety lock mechanism 31 at the bottom plate 22, so that when an abnormal ascending or descending operation of the magazine 15 is detected, a magazine ascending and descending mechanism 18A is stopped. Thus, the apparatus 30 is safer than the conventional one.

Next follows, with reference to FIGS. 3 to 15, a description of a magnetic tape cartridge autoloading apparatus 40 of a first embodiment according to the present invention.

Figure 3:
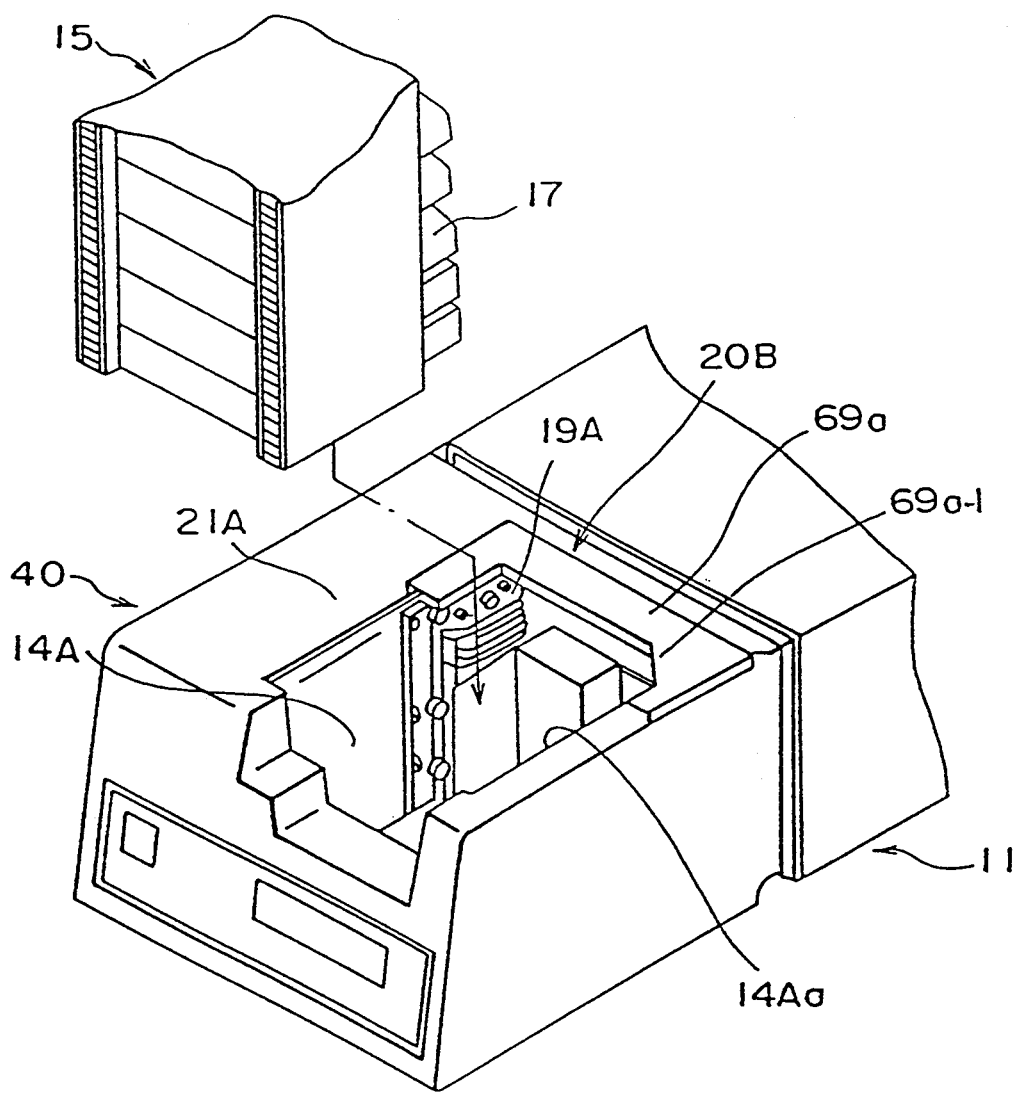
FIG. 3 shows a perspective view of a cartridge autoloading apparatus with a magazine of a first embodiment according to the present invention.
Figure 4:
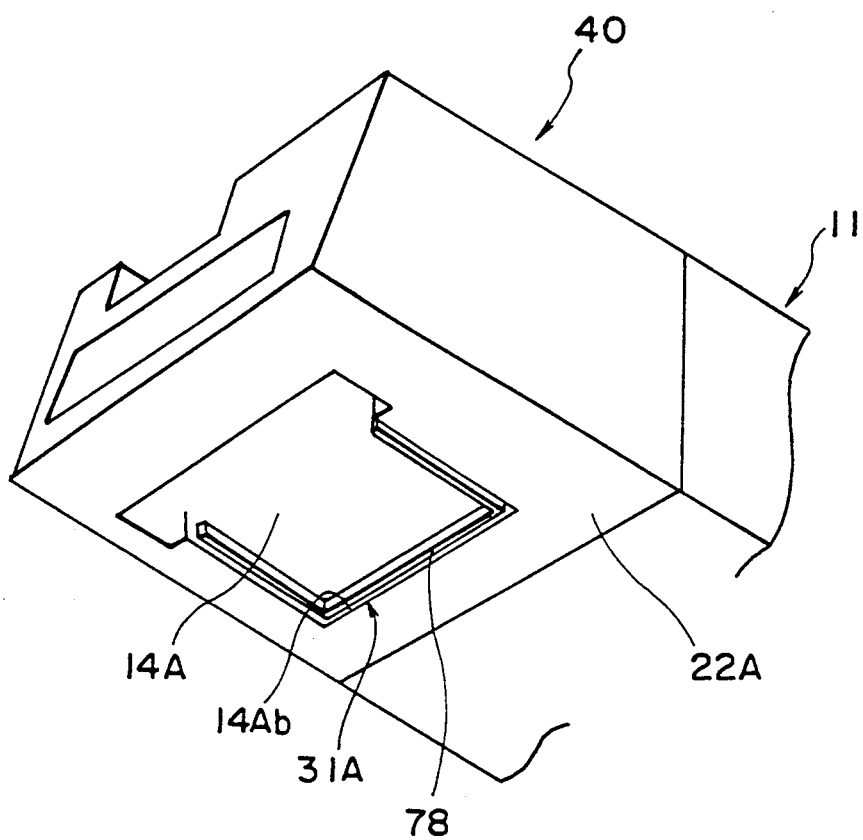
FIG. 4 shows a perspective view of the apparatus shown in FIG. 3 viewed from a bottom plate.
Figure 5:
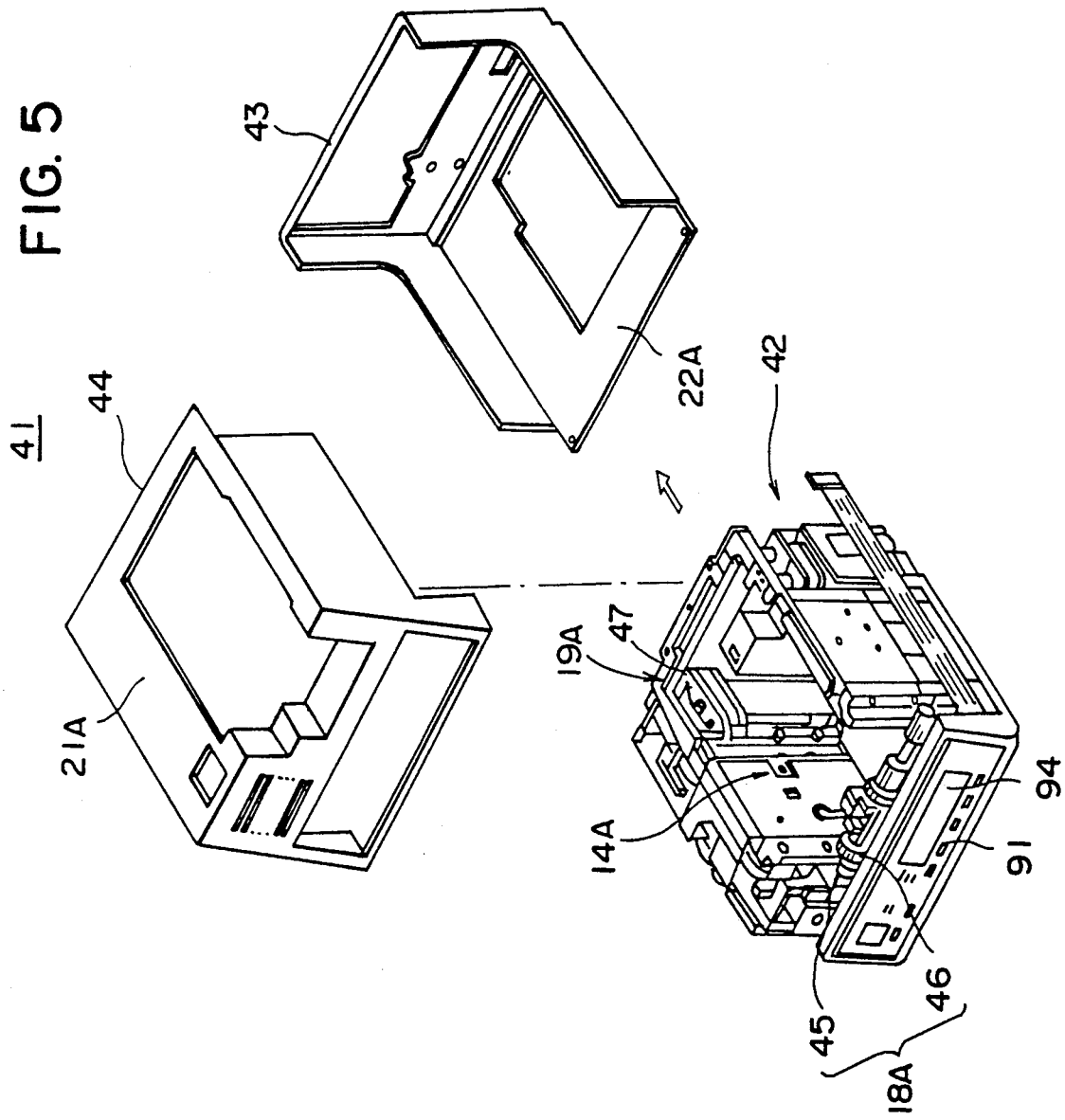
FIG. 5 shows an exploded perspective view of the apparatus shown in FIG. 3.

The Apparatus 40 is attached, as shown in FIGS. 3 and 4, to a front side of a magnetic tape cartridge recording and retrieval apparatus 11. The apparatus 40 includes a body generally indicated at 41 (FIG. 5) whose mechanism part 42 is enclosed by a base 43 and a cover 44. The mechanism part 42 includes the magazine ascending and descending mechanism 18A and a magnetic tape cartridge loading mechanism 19A which are opposite to a perforation path 14A.

Figure 6:
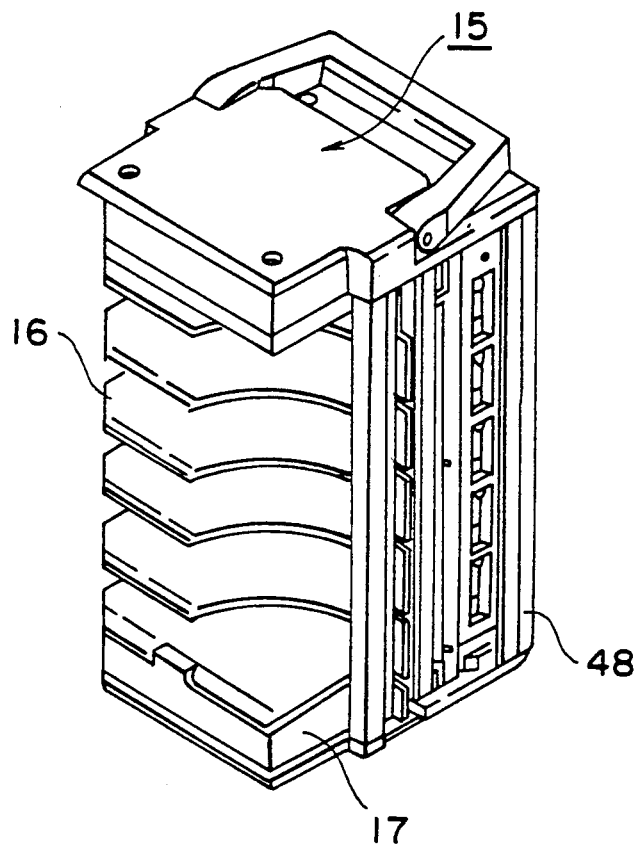
FIG. 6 shows a perspective view of the magazine shown in FIG. 3.
Figure 7:
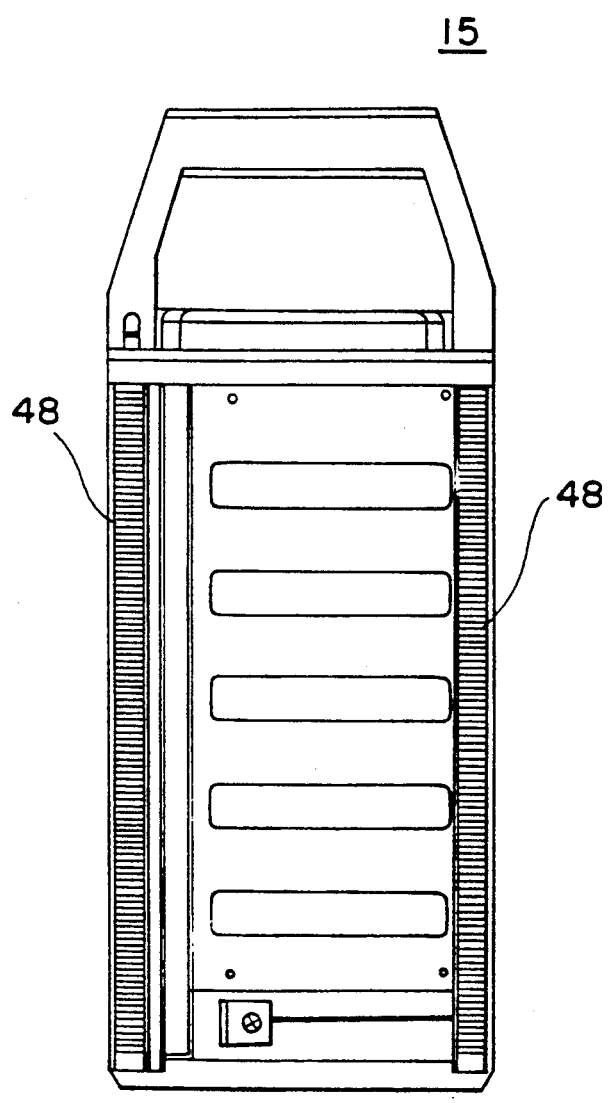
FIG. 7 shows a front view of the magazine shown in FIG. 6.

The magazine ascending and descending mechanism 18A includes a motor 45 and a pinion 46 rotated by the motor 45. The magnetic tape cartridge loading mechanism 19A includes a feeding belt 47 driven by a motor (not shown). The magazine 15 is pillar-shaped, as shown in FIGS. 6 and 7, and includes a plurality of shelves 16 vertically-arranged, and racks 48 at both sides of the back surface. Each shelf 16 accommodates a magnetic tape cartridge 17. The magazine 15, driven by the racks 48 and the pinion 46, is made to ascend in the direction $Z_1$ and descend in the direction $Z_2$, via the perforation path 14A.

Figure 8:
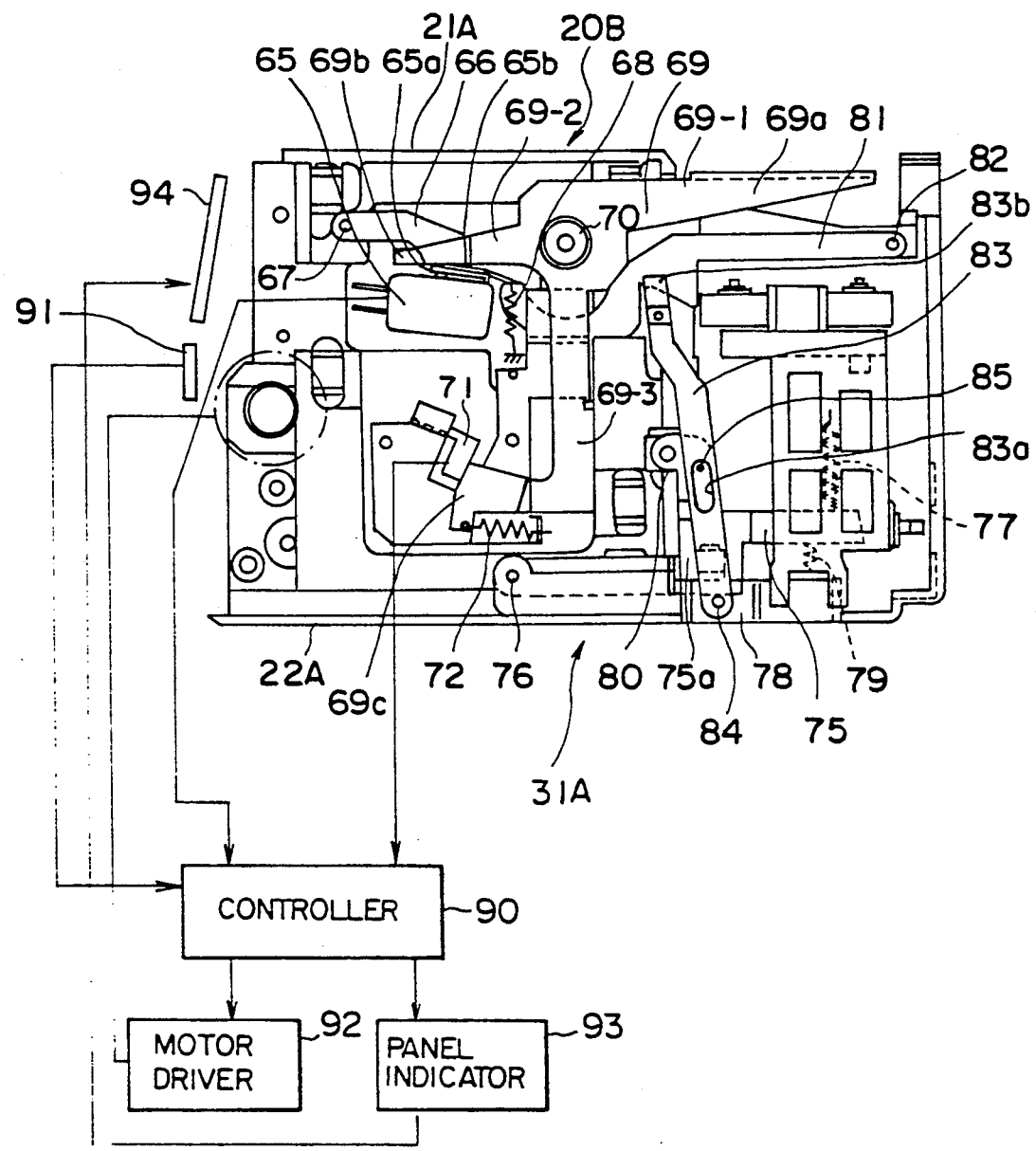
FIG. 8 shows a front view of a safety lock mechanism of the cartridge autoloading apparatus shown in FIG. 3.

Next follows a description of the safety lock mechanisms of the apparatus 40. As shown in FIGS. 3 and 8, the safety lock mechanism 20B is located at the crown plate 21A. As shown in FIGS. 4 and 8, the safety lock mechanism 31A is located at the bottom plate 22A.

First, a description will be given of the safety lock mechanism 20B. The mechanism part 42 includes a single microswitch 65 which is commonly used for the safety lock mechanisms 20B and 31A. Thus, the apparatus 40 becomes inexpensive and a controller 90, which will be described later, has a relatively simple construction.

Figure 9:
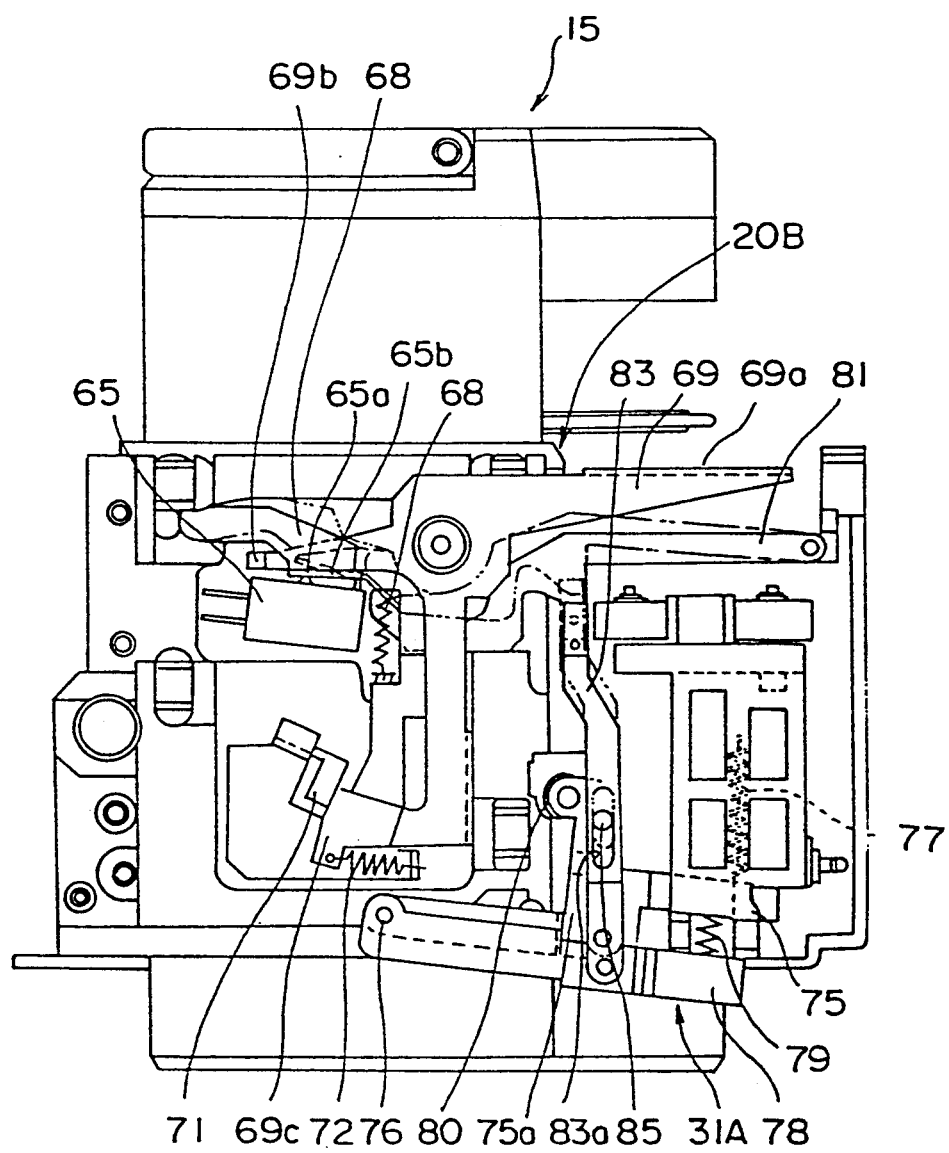
FIG. 9 shows a view of the cartridge autoloading apparatus having the magazine.
Figure 12:
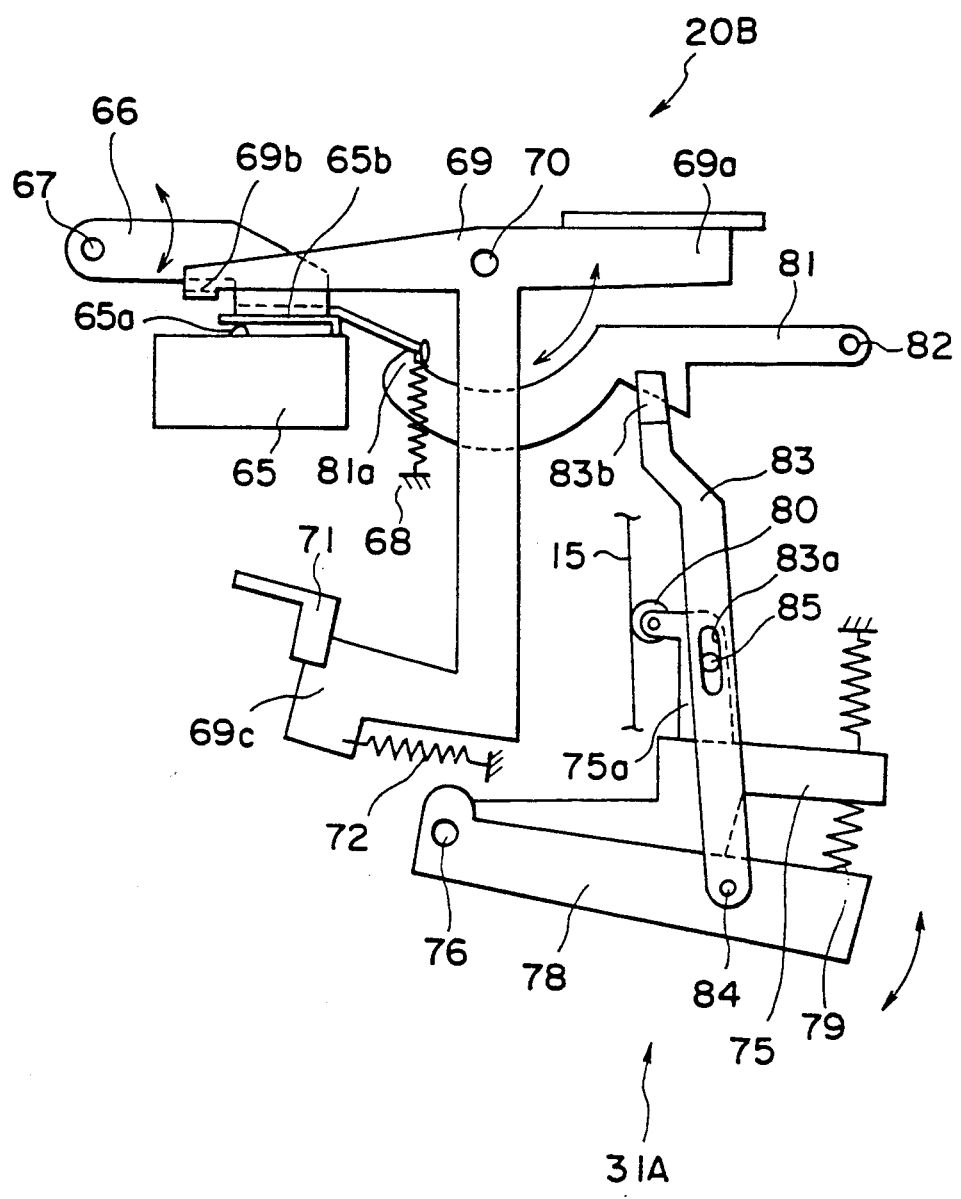
FIG. 12 shows a view of the safety lock mechanism located at a crown plate and the bottom plate.

In FIGS. 8, 9, and 12, an arm member 66 is pivotally supported around a pin 67, and forced clockwise by a tension coil spring 68, so as to push a push button 65a via a lever 65a of the microswitch 65. As a result, the microswitch 65 becomes ON.

The detecting lever 69, pivotally supported around a pin 70, is approximately T-shaped, as shown in FIG. 8, and includes three arms 69-1, 69-2, and 69-3. The first arm 69-1 extends in a direction of the crown plate 18, and includes a hook 69a at the top thereof, as shown in FIG. 3. The hook 69a is opposite to an opening 14Aa of a perforation path 14A. In addition, the hook 69a includes a tab 69a-1 to detect an improperly oriented cartridge 17 (FIG. 13B). The second arm 69-2, located under the arm member 66, includes a fixing tab 69b at the top thereof. The third arm 69-3 includes a cover 69c at the top thereof. The cover 69c is insertable into a slit of the photointerrupter 71. The detecting lever 69 is forced counterclockwise by a tension coil spring 72. The spring force of the spring 72 is smaller than that of the spring 68.

Figure 10:
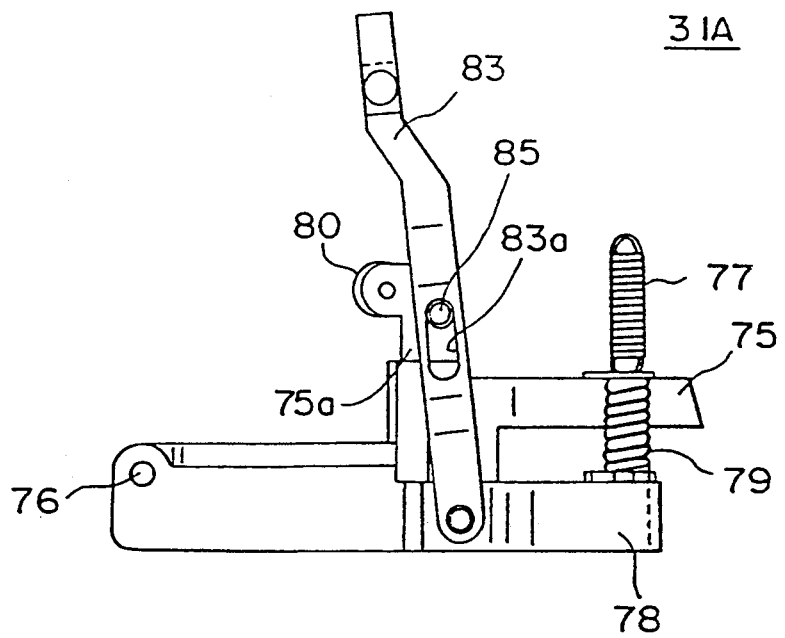
FIG. 10 shows a view of the safety lock mechanism shown in FIG. 8 located at the bottom plate.
Figure 11:
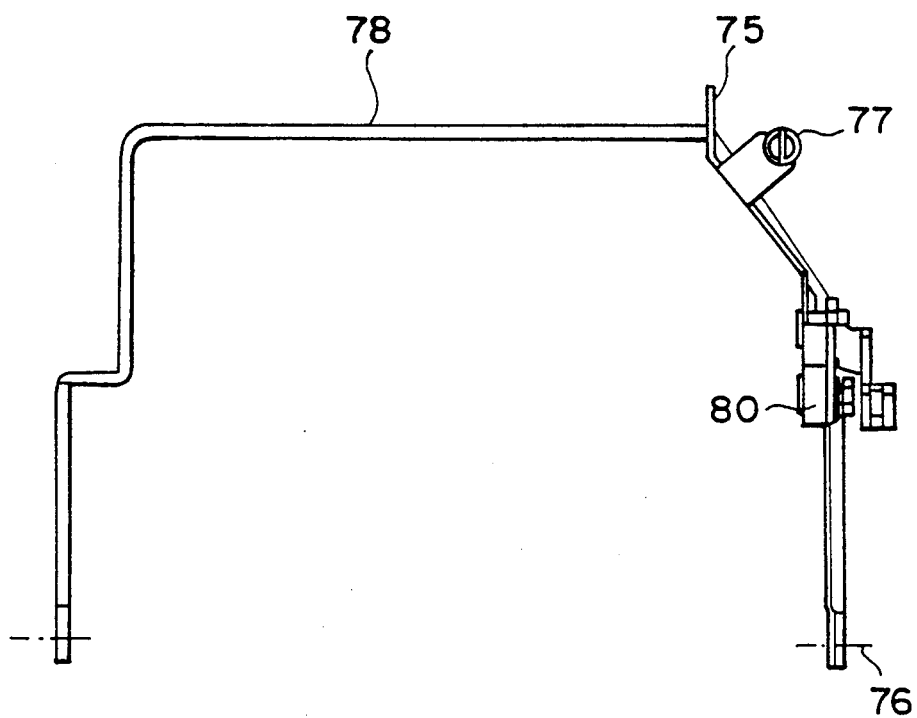
FIG. 11 shows a safety lock mechanism shown in FIG. 10 located at the bottom plate.

Next follows a description of the safety lock mechanism 31A. A base lever 75 is pivotally supported around a pin 76, as shown in FIGS. 8 and 10, and forced counterclockwise by a tension coil spring 77. The detecting lever 78, pivotally supported around the pin 76, is approximately U-shaped as shown in FIG. 11, and is forced clockwise by a compression coil spring 79 located between the detecting lever 78 and the base lever 75. The detecting lever 78 extends along the opening 14Aa of the perforation path 14A, as shown in FIG. 4. An arm 75a projects upwardly from the base lever 75, and is coupled to a roller 80 at the top thereof. One end of an operation lever 81 is pivotally supported around a pin 82 to be horizontally arranged. A top 81a (FIG. 12) of the operation lever 81 is opposite to the arm member 66. The transmission arm 83 upwardly extends while a lower end thereof is pivotally supported around a pin 84 on the detecting lever 78, as shown in FIGS. 10 and 12, and a slit 83a thereof is engaged with the pin 85 of the arm 75a. A fork 83b is provided at the top of the transmission arm 83, and engaged with the operation lever 81. The transmission arm 83 is restricted to move downwardly since an end of the slit 83a is fixed by the pin 85. The detecting lever 78 is accommodated in the body 41, and does not project from the bottom plate 22. Thus, avoiding potential interference simplifies removal of an adjacent unit installed below the recording and retrieval apparatus 11 from the rack 12 for maintenance procedures. The operation lever and the transmission arm 83 transmit an operation of the safety lock mechanism 31A to the arm member 66. The microswitch 65 and the photointerrupter 71 are arranged so that the photointerrupter 71 can operate earlier than the microswitch 65.

Next follows, with reference to FIG. 8 a description of a control system responsive to safety lock mechanisms 20B and 31A. The control circuit 90 is connected to the photointerrupter 71, the microswitch 65, and an operation board 91 (shown in FIG. 5). The controller 90 controls operations of a motor driver 92 and a panel indicator 93. The motor driver 92 drives the motor 45 (shown in FIG. 1). The panel indicator 93 indicates an alarm information on a liquid panel 94.

Next follows a description of an operation of the apparatus 40; mainly a description of operations of the safety lock mechanisms 20B and 31A during an abnormal condition. As explained below, abnormal conditions include fingers obstructing the path of the magazine 15 and improperly oriented cartridges 17. In response to a control signal from the controller 90, the motor driver 92 forwardly drives the motor 45 and thus the magazine 15 is made to descend. When the magazine 15 is made to descend, a side surface of the magazine 15 pushes the roller 80 shown in FIG. 8, so that the base lever 75 and the detecting lever 78 rotate clockwise, as shown in FIG. 9, and the detecting lever 78 is projected downwardly from the bottom plate 22A. If an operator accidentally holds his/her finger between the shelf 16 and the crown plate 21A, the hook 69a is pushed down and the detecting lever 69 is rotated counterclockwise against the spring 72. The photointerrupter 71 operates in response to the counterclockwise rotation of the detecting lever 69, but, the microswitch 65 remains ON.

Then the motor driver 92 is driven by the control signal from the controller 90, the motor 45 is rotated backwardly and thus the magazine 15 is made to ascend to be ejected from the apparatus 40. Since the apparatus 40 is not reset and continues to operate, a driving efficiency thereof is not lowered.

Figure 13A:
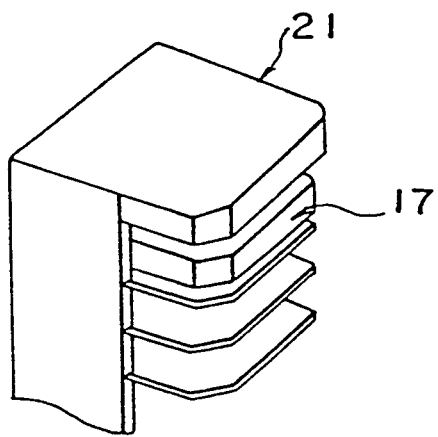
FIG. 13A shows a view of the magazine accommodating properly oriented a cartridge.
Figure 13B:
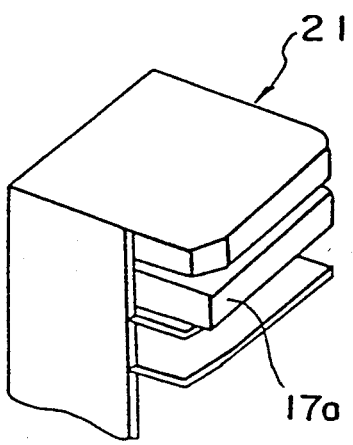
FIG. 13B shows a view of the magazine accommodating an improperly oriented cartridge.

A cartridge 17 is supposed to be inserted, as shown in FIG. 13A, into the magazine 15. If a cartridge 17 is inserted with an incorrect orientation into the magazine 15, as shown in FIG. 13B, a part 17a thereof is projected from the magazine 15. In this case part 17a engages tab 69a-1, the cartridge 17 strongly pushes the hook 69a, and the lever 69 is rotated clockwise against the springs 72 and 68. In response, cover 69c operates the photointerrupter 71, and firing tab 69b pushes up the arm member 66, which turns off the microswitch 65. Then, the motor driver 92 is stopped by the control signal from the controller 90, and thus the motor 45 is stopped. Simultaneously, the panel indicator 93 indicates, in response to the control signal from the controller 90, "DETECTED INVERSE CARTRIDGE IN MAGAZINE" on the panel 94 thereof, so as to inform an operator of the abnormality. Until the operator pushes a reset button, (not shown) the apparatus 40 remains in the above condition. When the operator pushes the reset button, the motor 45 is backwardly rotated in response to the control signal from the controller 90. Thus, the magazine 15 is made to ascend to be ejected from the apparatus 40.

If a cartridge 17-1 projects from the magazine 15, as shown by two-dotted lines in FIG. 2, while the magazine 15 is made to ascend, or if an operator accidentally holds his/her finger between the detecting lever 78 and the shelf 16, the cartridge or the finger is held between the detecting lever 78 and the shelf 16, as shown in FIG. 9 so that the lever 78 is pushed up against the spring 79. When the lever 78 is pushed up, the transmission arm 83 moves upwardly while the slit 83a is guided by the pin 85. Simultaneously, the fork 83b pushes up the operation lever 81 to rotate it clockwise. When the operation lever 81 is rotated clockwise, the top 81a pushes up the arm member 66 to rotate it against the spring 68. Consequently, the microswitch 65 is turned off. When the microswitch 65 is turned off, the motor driver 92 and the motor 45 are stopped by the control signal from the controller 90 shown in FIG. 8. In addition, the panel indicator 93 operates, in response to the control signal from the controller 90, "DETECTED INVERSE CARTRIDGE IN MAGAZINE" on the panel 94 thereof, so as to inform the operator of it. In response, the operator inserts the projecting cartridge 17-1 into the magazine 15, and then pushes the reset button. As a result, the control signal is output from the controller 90 to backwardly rotate the motor 45. Then the magazine is made to ascend to be ejected from the apparatus 40. Since the lever 78 downwardly projects, as shown in FIG. 9, from the bottom plate 22A, a stroke while the lever 78 is rotated upwardly becomes large. As a result, a time interval from when a finger of an operator is start to be held to when the finger thereof is actually held becomes relatively long, and thus the operator can easily pulls out his/her finger. That is, the operator can easily avoid his/her finger being held, and thus the safety can be improved.

Figure 14:
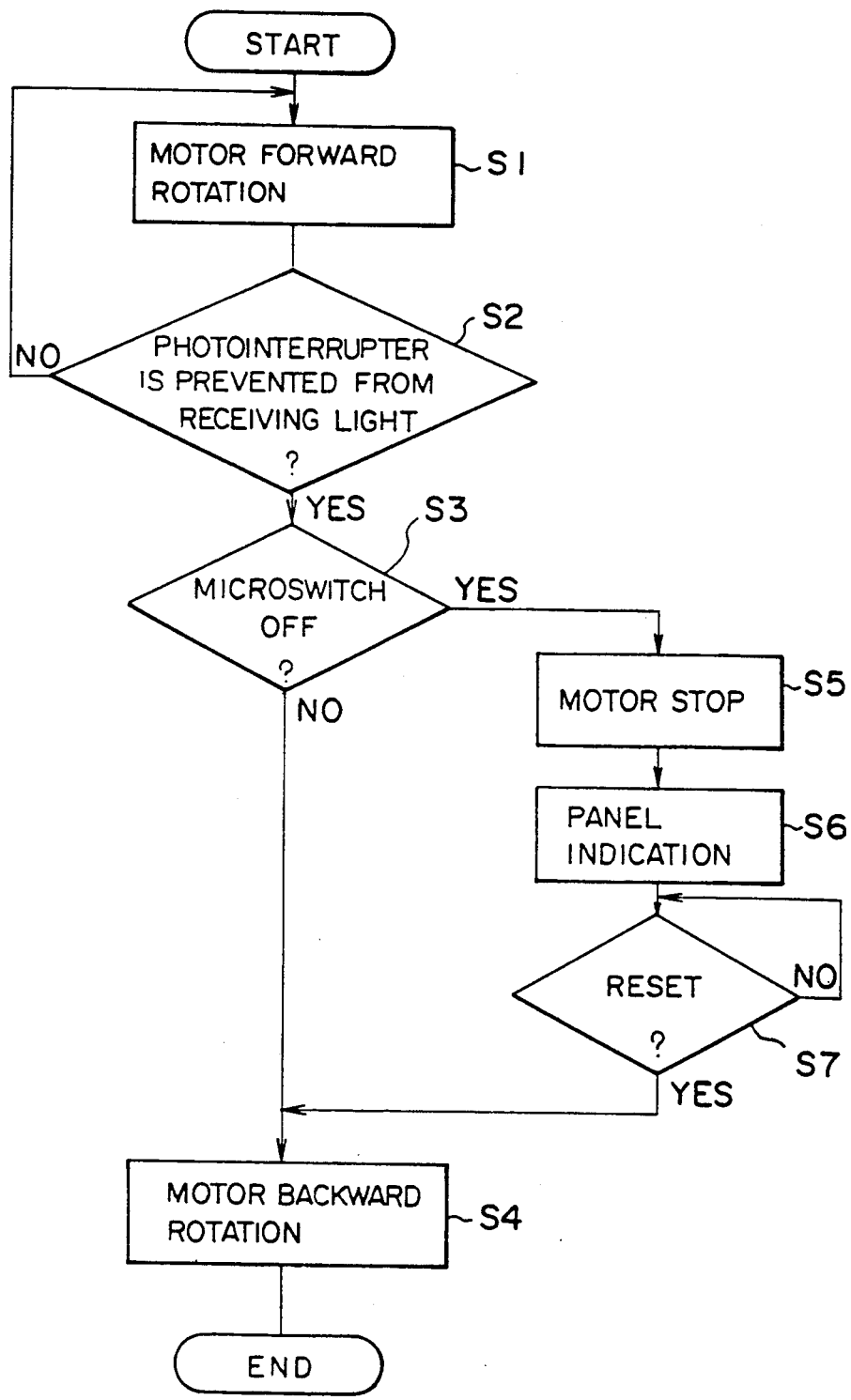
FIG. 14 shows a flowchart of a controller shown in FIG. 8 when the safety lock mechanism located at the crown plate is working.

The controller 90 shown in FIG. 8 is constructed by a microcomputer which operates in accordance with a flowchart shown in FIG. 14 while the magazine 15 is made to descend.

First, the controller 90 forwardly rotates the motor 45 (in step $S_1$), and judges whether or not the photointerrupter 71 is prevented from receiving a light (in step $S_2$). If a judging result is "YES", the controller 90 judges whether or not the microswitch 65 is OFF (in step $S_3$). Alternatively, if the judging result in the step $S_2$ is "NO", the controller 90 stops the motor 45 (in step $S_4$). If the controller 90 judges YES in the step $S_3$, the controller 90 stops the motor 45 (in step $S_5$) and makes the panel indicator indicate (in step $S_6$) Subsequently, the controller 90 judges whether or not the apparatus 40 is reset (in step $S_7$). If a judging result is "YES", the controller 90 backwardly rotates the motor 45 (in step $S_4$).

Figure 15:
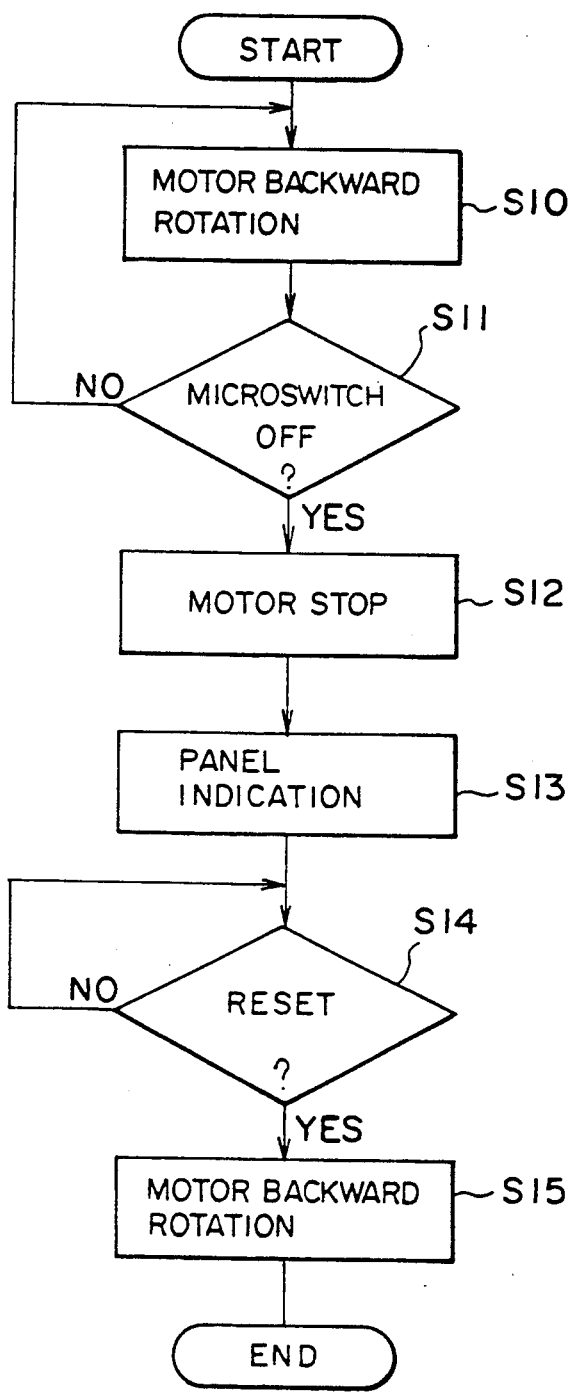
FIG. 15 shows a flowchart of the controller shown in FIG. 8 when the safety lock mechanism located at the bottom plate is working.

When the magazine 15 is made to ascend, the microcomputer operates in accordance with a flowchart shown in FIG. 15.

First, the controller 90 backwardly rotates the motor 45 (in step $S_{10}$), and judges whether or not the microswitch is OFF (in step $S_{11}$). If a judging result is "YES", the controller 90 stops the motor 45 (in step $S_{12}$) and makes the panel indicator indicate (in step $S_{13}$). Next, the controller 90 judges whether or not the apparatus 40 is reset (in step $S_{14}$). If the judging result is "YES", the controller 90 backwardly rotates the motor 45 (in step $S_{15}$).

Figure 16:
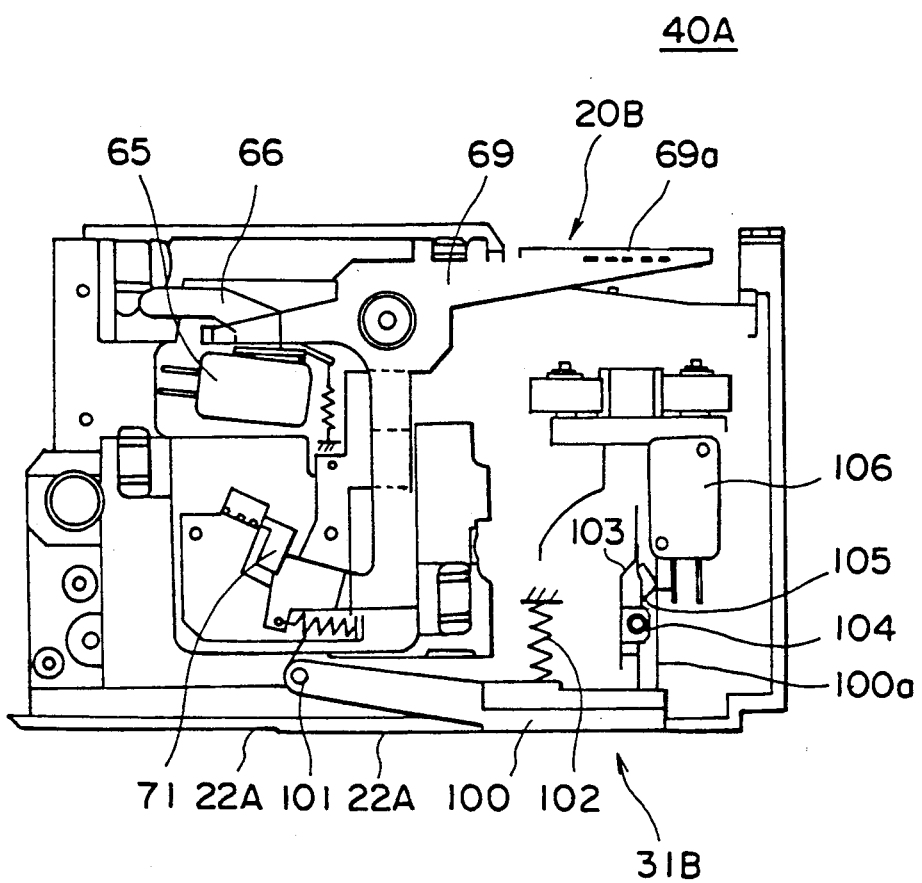
FIG. 16 shows a front view of a cartridge autoloading mechanism of a second embodiment according to the present invention.
Figure 17:
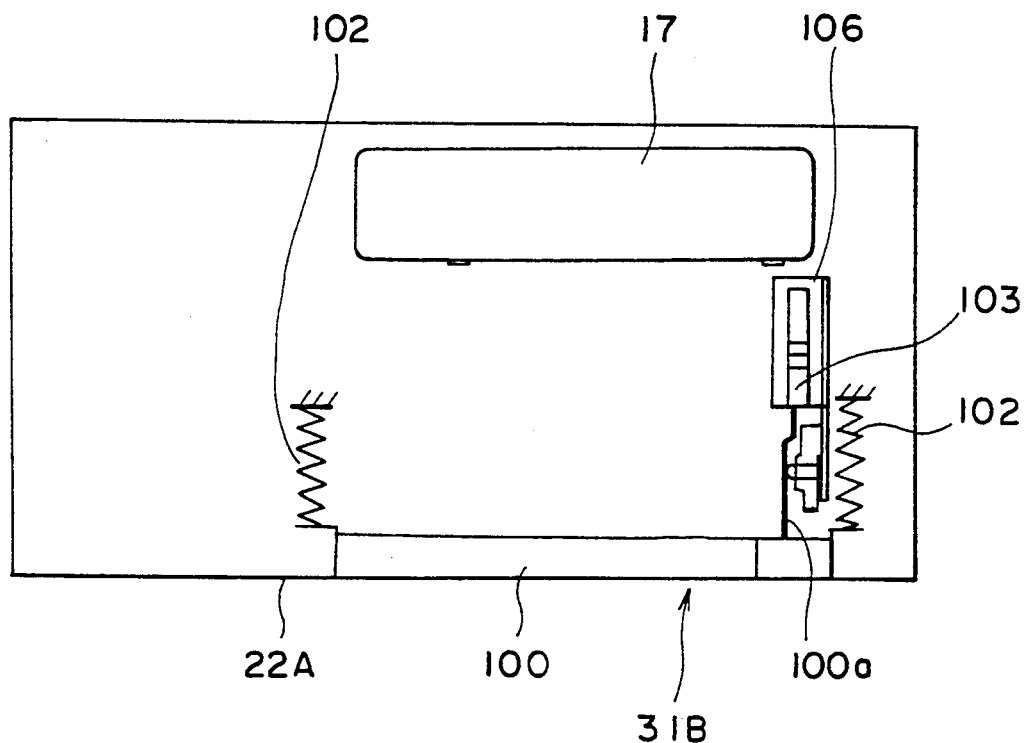
FIG. 17 shows a side view of the apparatus shown in FIG. 16.
Figure 18:
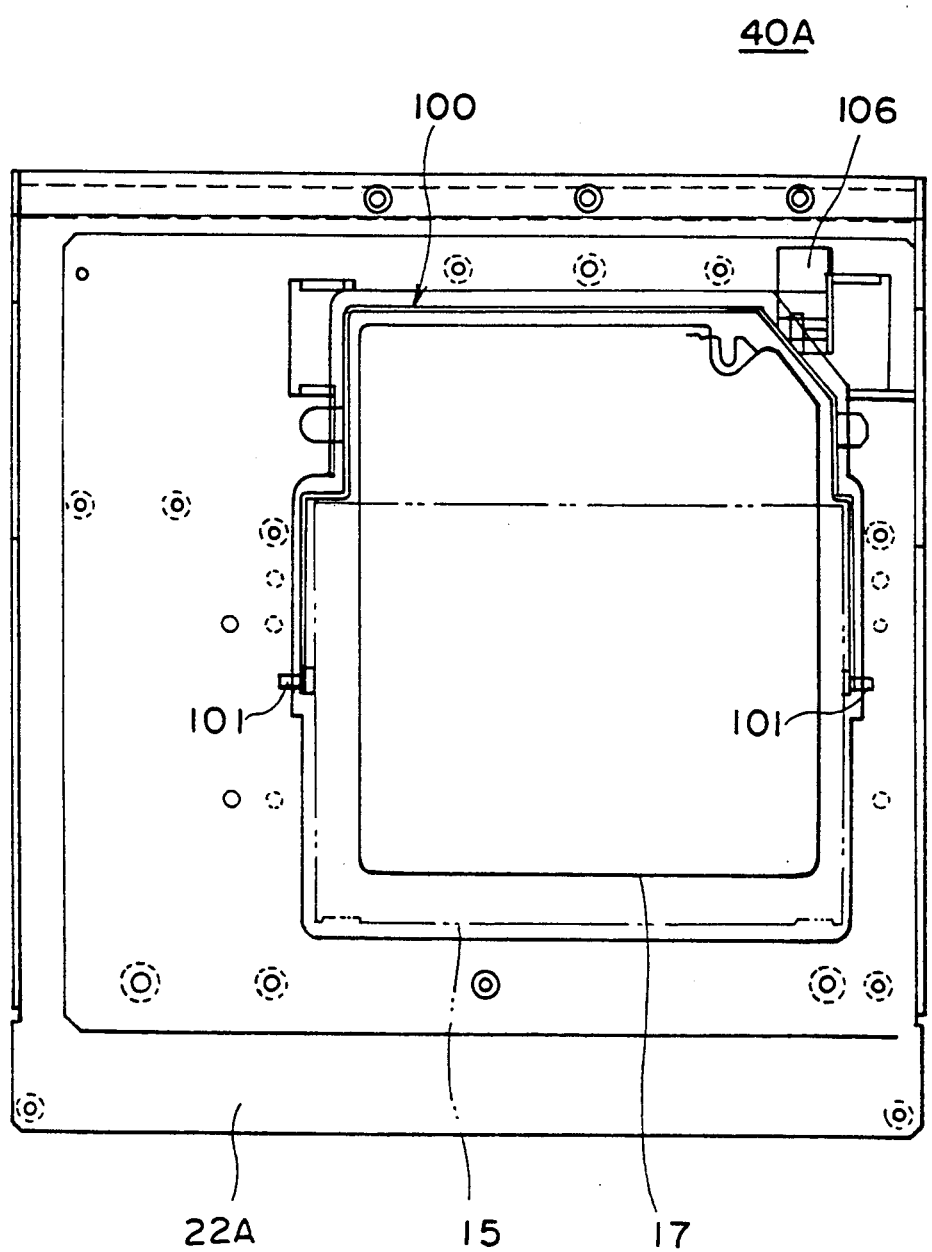
FIG. 18 shows a plane view of the apparatus shown in FIG. 16.

Next follows, with reference to FIGS. 16 to 18, a description of a magnetic tape cartridge autoloading apparatus 40A of a second embodiment according to the present invention.

The apparatus 40A has a construction similar to that of the apparatus 40 shown in FIG. 8, except a safety lock mechanism 31B located at the bottom plate. Those elements in FIG. 16 which are the same as corresponding elements in FIG. 8 are designated by the same reference numerals, and a description thereof will be omitted.

A description will now be given of the safety lock mechanism 31B. A detecting lever 100, pivotally supported around a pin 101, is U-shaped, as shown in FIG. 15. The lever 100 is forced clockwise by compression coil springs 102, as shown in FIG. 17. An arm member 103, pivotally supported around a pin 104, is forced clockwise by a spring 105 to push and turn on the microswitch 106. The lever 100 includes a standing tab 100a opposite to the arm member 103. When the projecting cartridge 17-1 collides with the lever 100, during magazine 15 ascent the lever 100 is pushed up and rotated counterclockwise against the springs 102. When the lever 100 is rotated counterclockwise, the standing tab 100a pushes the arm member 103 to rotate it counterclockwise. Thus, the microswitch 106 is turned OFF, and consequently the motor 45 and the magazine 15 are stopped, as described in the first embodiment.

Figure 19:
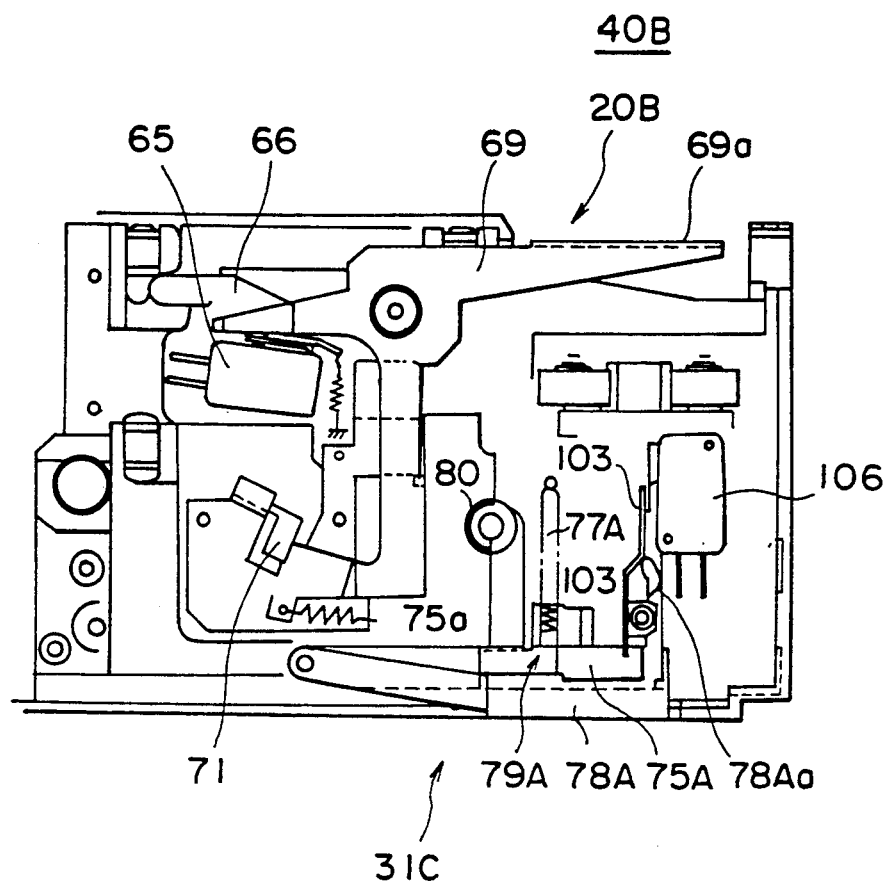
FIG. 19 shows a front view of a cartridge autoloading apparatus of a third embodiment according to the present invention.
Figure 20:
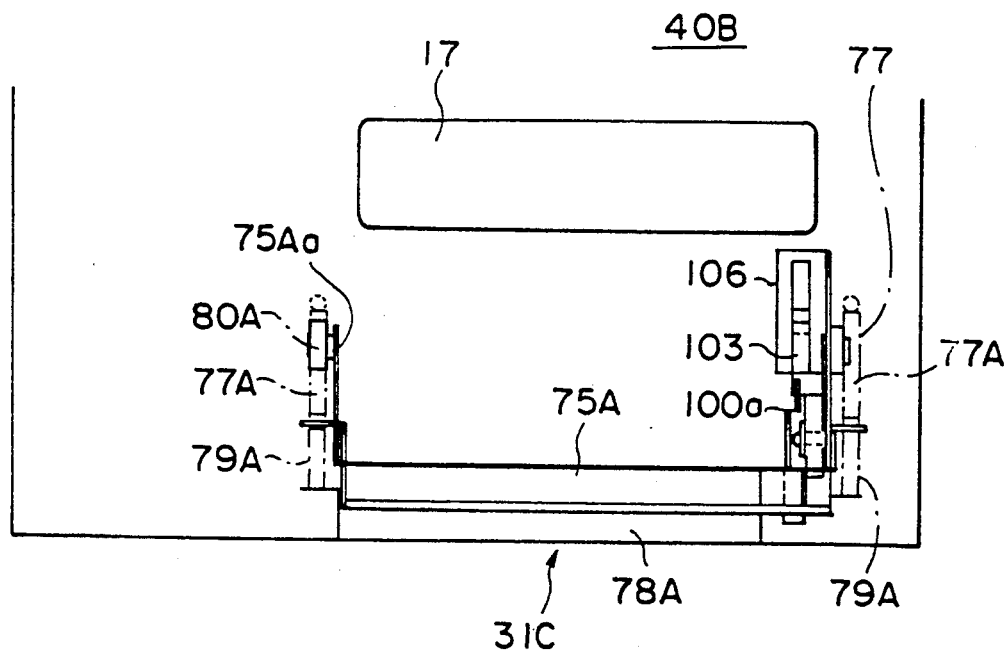
FIG. 20 shows a side view of the apparatus shown in FIG. 19.
Figure 21:
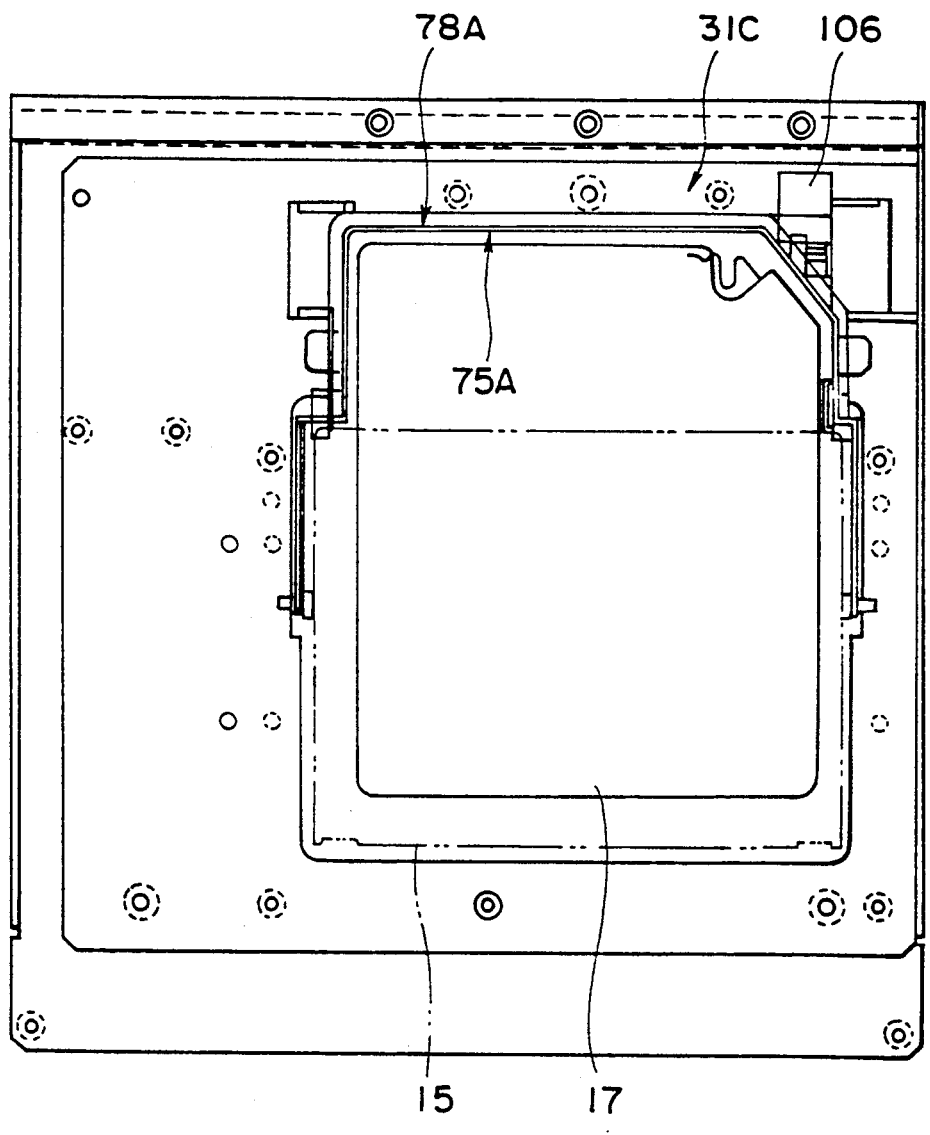
FIG. 21 shows a plane view of the apparatus shown in FIG. 19.

Next follows, with reference to FIGS. 19 to 21, a description of a magnetic tape cartridge autoloading apparatus 40B of a third embodiment according to the present invention. The apparatus 40B has a construction similar to that of the apparatus 40 shown in FIG. 8, except a safety lock mechanism 31C located at the bottom plate. In addition, the safety lock mechanism 31C is substantially the same as the safety lock mechanism 31A shown in FIG. 8. Those elements in FIGS. 19 to 21, which are the same as corresponding elements in FIGS. 8 to 16 are designated by the same reference numerals, and a description thereof will be omitted.

The safety lock mechanism 31C includes, as shown in FIGS. 19, 20 and 21, a detecting lever 78A, a base lever 75A, springs 77A and 79A, a microswitch 106, an arm member 103, etc. A standing tab 78Aa, provided on the detecting lever 78A, cooperates with the arm member 103. When the magazine 15 is set in the apparatus 40B, the roller 80 is pushed and the detecting lever 78A is projected from the bottom plate 22A, as shown in FIG. 9. When the projecting cartridge 17-1 collides with the lever 78A, during magazine 15 ascent the lever 78A is pushed up and rotated counterclockwise against the spring 79A. When the lever 78Aa is rotated counterclockwise, the standing tab 78a pushes the arm member 103 to rotate it counterclockwise. Thus, the microswitch 106 is turned OFF, and consequently the motor 45 and the magazine 15 are stopped, as described in the first and second embodiments.

Incidentally, the present invention is not limited to a magnetic tape cartridge, and is applicable to an optical disk cartridge.

Further, the present invention is not limited to these preferred embodiments, and various variations and modifications may be made without departing from the scope of the present invention.

What is claimed is:

1. A cartridge autoloading apparatus attached to a cartridge recording and retrieval apparatus, said cartridge autoloading apparatus comprising:
   a body which includes;
      a crown plate,
      a bottom plate, and
      a perforation path perforated in a vertical direction of said body;
   a magazine set in the perforation path, said magazine accommodating a plurality of cartridges;
   magazine ascending and descending means, provided in said body, for ascending and descending said magazine via the perforation path;
   cartridge loading means, provided in said body, for loading one of the cartridges in the magazine, into the cartridge recording and retrieval apparatus;
   first safety lock means, located at the crown plate of said body, for stopping an operation of said magazine ascending and descending means if the magazine is made to descend with an abnormal condition;
   second safety lock means, located at the bottom plate of said body, for stopping an operation of said magazine ascending and descending means if the magazine is made to ascend with the abnormal condition; and
   switch means, responsive to said first safety lock means and to said second safety lock means, for stopping the operation of said magazine ascending and descending means.

2. An apparatus according to claim 1, wherein said second safety lock means comprises:
   a detecting lever, approximately horizontally arranged and opposite to an opening of the perforation path at a bottom plate side, one end of the detecting lever being pivotally supported, a top side of the detecting lever being upwardly and downwardly movable, and the top side thereof being upwardly pushed and rotated so as to make the switch means operate in case of abnormality.

3. An apparatus according to claim 1, wherein said second safety lock means comprises:
   a base lever, approximately horizontally arranged, one end of the base lever being pivotally supported, a top side of the base lever being upwardly and downwardly movable;
   a spring which forces the base lever in a direction in which the top side of the base lever is upwardly moved;
   a detecting lever, approximately horizontally arranged and opposite to an opening of the perforation path at a bottom plate side, one end of the detecting lever being pivotally supported, a top side of the detecting lever being upwardly and downwardly movable, and the top side thereof being upwardly pushed and rotated so as to make the switch means operate in case of abnormality;
   a spring, located between the base lever and the detecting lever, for downwardly moving the top side of the detecting lever; and
   a compressed part, provided on the base lever, which is pushed by the magazine set in the perforation path, to rotate the base lever so that the top side of the base lever can be downwardly moved, the detecting lever being accommodated in said body when the magazine is not set in the perforation path, and the detecting lever being projected from the bottom plate of said body if the magazine is set in the perforation path.

4. An apparatus according to claim 1,
   wherein said switch means comprises a switch;
   wherein said first safety lock means comprises:
   a spring-forced switch lever which pushes the switch; and
   a first detecting lever, pivotally supported and opposite to an opening of the perforation path at the crown plate, said first detecting lever being downwardly pushed so as to make the switch lever release from pushing the switch, and
   wherein said second safety lock means comprises:
   a second detecting lever, approximately horizontally arranged and opposite to an opening of the perforation path at a bottom plate side, one end of the second detecting lever being pivotally supported, a top side of the detecting lever being upwardly and downwardly movable, and the top side thereof being upwardly pushed and rotated in case of abnormality; and
   a transmission mechanism for transmitting a rotation of the second detecting lever in case of abnormality, to the switch lever so as to make the switch lever release from pushing the switch.

5. An apparatus according to claim 1,
wherein said switch means comprises a switch;
wherein said first safety lock means comprises:
a spring-forced switch lever which pushes the switch; and
a first detecting lever, pivotally supported and opposite to an opening of the perforation path at the crown plate, said first detecting lever being downwardly pushed so as to make the switch lever release from pushing the switch, and
wherein said second safety lock means comprises:
a base lever, approximately horizontally arranged, one end of the detecting lever being pivotally supported, a top side of the base lever being upwardly and downwardly movable;
a spring which forces the base lever in a direction in which the top side of the base lever is upwardly moved;
a second detecting lever, approximately horizontally arranged and opposite to an opening of the perforation path at a bottom plate side, one end of the detecting lever being pivotally supported, a top side of the detecting lever being upwardly and downwardly movable, and the top side thereof being upwardly pushed and rotated in case of abnormality;
a spring, located between the base lever and the detecting lever, for downwardly moving the top side of the detecting lever; and
a compressed part, provided on the base lever, which is pushed by the magazine set in the perforation path, so as to rotate the base lever so that the top side of the base lever can be downwardly moved, the detecting lever being accommodated in said body when the magazine is not set in the perforation path, and the detecting lever being projected from the bottom plate of said body when the magazine is set in the perforation path; and
a transmission mechanism for transmitting a rotation of the second detecting lever in case of abnormality, to the switch lever so as to make the switch lever release from pushing the switch.

6. An apparatus according to claim 2, wherein said switch means comprises a single switch.

7. An apparatus according to claim 3, wherein said switch means comprises a single switch.

* * * * *

UNITED STATES PATENT AND TRADEMARK OFFICE
CERTIFICATE OF CORRECTION

PATENT NO. : 5,313,349
DATED : May 17, 1994
INVENTOR(S) : Kotaki, et al.

It is certified that error appears in the above-indentified patent and that said Letters Patent is hereby corrected as shown below:

In column 2, line 66, before "properly," insert --a--; and before "cartridge", delete "a".

In column 4, line 8, delete "65a" and insert --65b--.

In column 4, line 67, delete "1" and insert --5--.

In column 5, line 36, delete "firing" and insert --fixing--.

In column 6, line 62, delete "15" and insert --18--.

Signed and Sealed this

Thirteenth Day of June, 1995

Attest:

BRUCE LEHMAN

*Attesting Officer*  *Commissioner of Patents and Trademarks*